United States Patent [19]

Möller

[11] 4,399,034
[45] Aug. 16, 1983

[54] LIQUID FILTERING APPARATUS

[76] Inventor: Bengt A. K. Möller, 23 Kabäcksvägen, Partille, Sweden, S-433 38

[21] Appl. No.: 315,531
[22] PCT Filed: Feb. 20, 1981
[86] PCT No.: PCT/SE81/00047
 § 371 Date: Oct. 26, 1981
 § 102(e) Date: Oct. 26, 1981
[87] PCT Pub. No.: WO81/02393
 PCT Pub. Date: Sep. 3, 1981

[30] Foreign Application Priority Data

Feb. 26, 1980 [SE] Sweden .................... 8001478

[51] Int. Cl.³ ............................................. B01D 23/12
[52] U.S. Cl. .................................................. 210/268
[58] Field of Search ............... 210/189, 268, 285, 286, 210/289, 291, 269

[56] References Cited

U.S. PATENT DOCUMENTS

| 2,057,887 | 10/1936 | Elliott et al. | 210/268 |
| 3,575,294 | 4/1971 | Hirowatari et al. | 210/189 |
| 3,598,235 | 8/1971 | Demeter | 210/268 |
| 4,000,066 | 12/1976 | Squires | 210/189 |

FOREIGN PATENT DOCUMENTS 378361 9/1975 Sweden .
396552 9/1977 Sweden .

Primary Examiner—Ivars C. Cintins
Attorney, Agent, or Firm—Burns, Doane, Swecker & Mathis

[57] ABSTRACT

The present invention relates to an apparatus for filtering a liquid through a movable filter bed consisting of granular material, with continuous scavenging of the bed material and having the characterizing functions as follows:

the filtering takes place in that liquid from a central inlet passes outward and upward through the filter bed.

the filter bed in operation moves continuously downward, and the bed material is renewed continuously by supply to the upper portion (A) of the filter.

the separation of impurities in the liquid takes place substantially in the central portion (C) of the filter and to a small extent in the portions located closest to the outlet.

the washing of polluted bed material takes place in several steps, the first one thereof by fluidization of the material in the lowermost portion (D) of the filter, and the last one with liquid and air in the upper portion (A) of the filter.

polluted bed material is drained in the lower portion of the filter together with transport liquid to a sand washing equipment located outside the filter, from which equipment transport liquid is returned to the lower portion (D) of the filter and washed material of the bed is transported to the upper portion (A) of the filter to be finally washed and distributed over the entire surface of the filter bed.

in the apparatus, liquid can be filtered, in which the permissible size of the impurities is limited only by the dimension of the inlet conduit. Owing to the function of the apparatus the risk is eliminated that outgoing filtered liquid is polluted by release of dirt from the filter bed or from bed material returning to the bed after washing.

2 Claims, 1 Drawing Figure

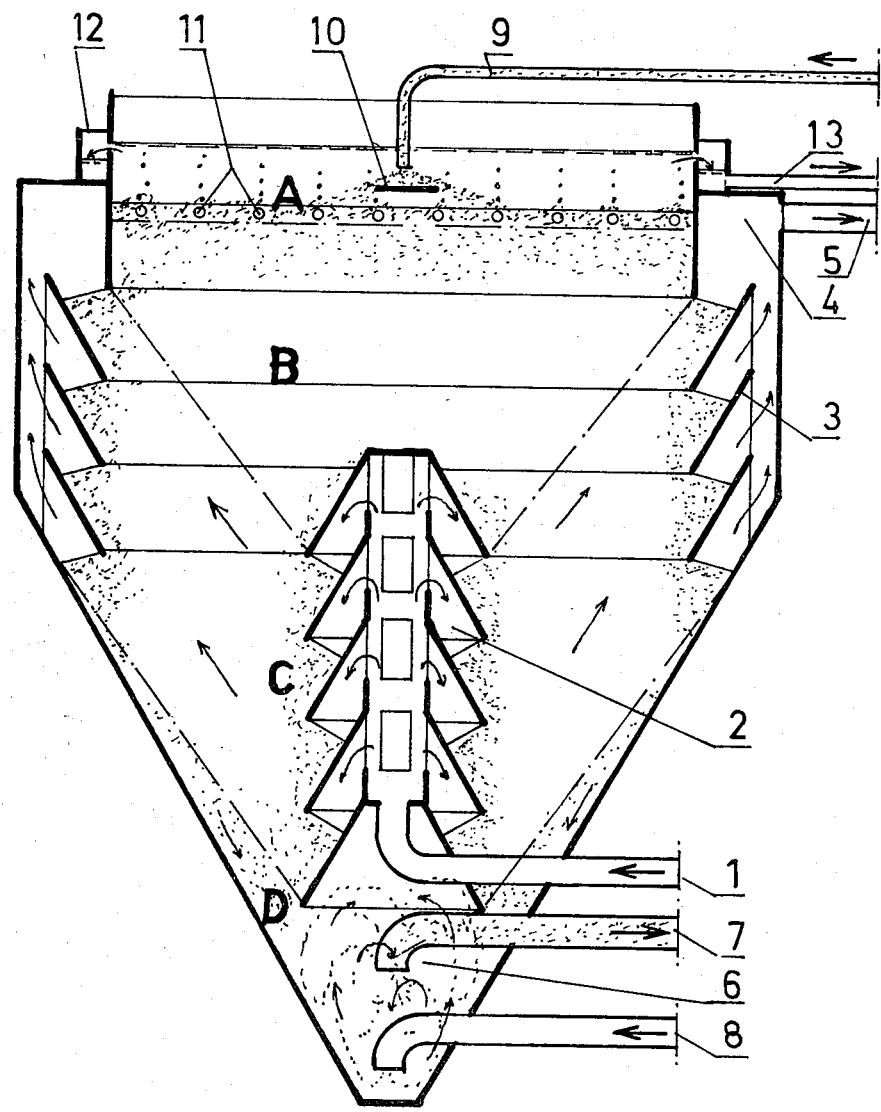

LIQUID FILTERING APPARATUS

This invention relates to an apparatus for filtering a liquid through a movable filter bed consisting of granular material, which is scavenged continuously.

A filtering technique in this connection implies that a liquid containing dissolved and solid impurities is passed through a bed of granular material, usually sand, whereby material suspended in the liquid is separated and remains in the bed. By special inserts also substances dissolved in the liquid can be flocculated out prior to or in the filter and thereafter be separated therein.

Filtering normally takes place in a stationary bed with vertically directed flow and, owing to the separation of impurities, with ever increasing filter resistance. After a certain time the filtering operation is interrupted, and the bed is scavenged with liquid, in certain cases with liquid and air.

During the scavenging process relatively large amounts of water are consumed, which are recovered for being cleaned. The scavenging process further requires special installations in the form of pumps, valves, pipes, automatic equipment etc., to an extent which in relation to the installations required for filtering is considerable.

In order to avoid interruption for scavenging and to reduce the extent of the scavenging equipment, a known technique has been developed which applies a movable filter bed, the material of which is scavenged continuously and successively, and at which the scavenged material is returned to the movable bed. The polluted filter material is removed from the lower portion of the bed together with liquid and is transported by pumping to a washing plant, from which cleaned bed material is returned to the bed, and dirty scavenging liquid is directed away to be cleaned.

In a known apparatus the filtering takes place with downward flow, in the case of a circular bed with radial flow, in the bed to a vertical outlet screen in direct contact with the filter material. The transport of polluted filter material from the lower bed portion takes place with filtered liquid directly from the filter bed. The washing of the material is carried out with transport liquid and incoming unfiltered liquid. Due to the movements of the bed, this method implies that the filter material closest to the outlet screen can contain impurities to such an amount, that the possibility of a certain discharge thereof together with outgoing liquid cannot be excluded. The openings in the outlet screen which in view of the gain size of the filter material are small, also are subject to the risk of clogging.

In another known apparatus the filtering takes place with upward vertical flow in the bed to a liquid volume located above the bed surface, from which volume cleaned liquid is drained through grooves in the liquid surface. The transport of polluted filter material is carried out in the same way as in the apparatus described above, but the washing of the material in this case is carried out with transport liquid and outgoing filtered liquid. The washed bed material is returned to the bed through the filtered liquid volume above the bed surface. This implies the possibility that dirt is transferred to the outgoing liquid when the material washing is not satisfactory.

The two methods described have in common, that the liquid required for material transport is drained from the system after having being used only once and together with added liquid. The applicability of these apparatus, therefore, is restricted for the reasons as follows.

The transport of granular material in a liquid presupposes a flow rate in the liquid which is adjusted to the material. When a transport liquid is being used once, it is essential that its amount can be maintained in a reasonable proportion in relation to the filtered liquid amount. It is further essential to state that the size of coarser impurities, which can be supplied to a filter, not only depends on the design of the infeed devices but also on the dimension of the pipes, in which the impurities after separation are to be transported.

The present invention eliminates the aforesaid disadvantages of the apparatus described above. Hereby the following advantages are obtained:

The filtering zone portion located closest to the outlet always is the cleanest one, the outlet is entirely open and not limited by screens and the like, bed material returned after cleaning does not pass through any zone of outgoing filtered water prior to the storage in the bed, the cleaning of polluted bed material takes place in several steps, the greater part of liquid used for material transport is recirculated, and all impurities, which possibly can be supplied to the filter, also can be removed therefrom via the system for the transport and washing of polluted bed material.

BRIEF DESCRIPTION OF THE DRAWING

The invention is described in greater detail in the following, with reference to the accompanying schematic drawing of a filter according to the present invention.

DETAILED DESCRIPTION OF THE PREFERRED EMBODIMENT

The filter shown in the drawing comprises with respect to its functioning the following zones, counted from above:

Zone A Final washing zone for the final cleaning of returned bed material and distribution thereof over the entire bed surface.

Zone B Storage zone for clean bed material.

Zone C Filtering zone.

Zone D Transport zone for polluted bed material.

As to its structural design, the filter comprises an upper cylindrical or rectangular portion and a funnel-shaped portion located therebelow.

Ingoing liquid is supplied to the filter via an infeed conduit 1 to an infeed device 2, which is located centrally in the filtering zone C of the filter bed. The liquid flows from this zone upward and outward through the filtering zone to outlet devices 3 located in the filter walls and continues from said devices to an outlet chamber 4 and further to an outlet conduit 5.

The material suspended in the liquid and separated in the filtering zone on the first hand is concentrated to the filtering zone portion located closest to the inlet and is transported at a successively decreasing extent to the outer portions of the zone.

The inlets and outlets are formed with inclined discs—baffles—which are positioned so that a distinct defining surface between filter bed and liquid is obtained.

In operation the filter bed moves continuously downward, whereby the bed material in the filtering zone C successively is replaced by clean bed material from the storage zone B. From the filtering zone the polluted bed material passes over to the transport zone D and is transported therein to a space 6, which is located farthest down in the filter and is defined by the shell of the bottom funnel and the lower baffle of the inlet device 2. Two conduits open into the space 6, viz. a drain conduit 7 for removing polluted bed material and transport liquid, and a return conduit 8 for returning transport liquid. Owing to the recirculation, a strong turbulence is effected in the space 6, as a result of which the bed material supplied from the transport zone is fluidized. This in its turn brings about a first scavenging of the bed material from pollutions.

Through the drain conduit 7 polluted bed material and transport liquid are transferred to a closed sand washing equipment of some known design, which is located outside the filter and completed with a coarse screen for separating coarse impurities. The greater part of the transport liquid is pumped from the sand washing plant through the return conduit 8 again to the filter. Bed material separated in the sand washing plant and, thus, having been passed through a second washing step, is pumped with a small amount of transport liquid via a sand conduit 9 and a distributor 10 to the final washing zone A located in the uppermost portion of the filter. In the washing zone the bed material is washed a third time and distributed over the entire bed surface, in that the liquid volume located above the bed surface is stirred by air, which is supplied through an air distribution system 11 located beneath the bed surface and close thereto. The cleaned bed material is passed over to the storage zone. The transport liquid is conducted away together with possible remaining dirt through an overflow to a scavenging liquid groove 12 and further via a scavenging liquid conduit 13 whereafter it is cleaned. The loss from the recirculation system for transport liquid of the filter due to the removal of the small amount of transport liquid is compensated for automatically from the filter.

The liquid level in the final washing zone A is balanced against the liquid pressures in the inlets and outlets of the filter, so that liquid exchange between the final washing zone and the storage zone B is prevented.

The principles, preferred embodiment and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A filtering apparatus comprising an upper cylindrical or rectangular portion and a funnel-shaped portion located below and having a continuous supply of clean bed material from above to a movable filter bed, said apparatus comprising means for continuously scavenging the material, inlet means for supplying a fluid to be filtered to the apparatus in the center of the lower portion thereof and along the total height of the filtering zone, outlets arranged at the outer edge of the apparatus and along the total height of the filtering zone, wherein the inlet and outlet means are placed individually in such a manner that there is formed a filtering zone, enclosed by funnel-shaped interfaces, one lower near the bottom casing of the apparatus and one upper from the upper edge of the inlet means to the upper edge of the outlet means, and the fluid to be filtered passes said filtering zone in an overall inclined upward flow.

2. The apparatus as defined in claim 1 comprising a defined space located beneath the bed for collection of polluted bed material, wherein a second fluid is recirculated over said space for continuous fluidization in and transport from said space of bed material by means for supplying the second fluid to said space, means for removing the second fluid and fluidized material from said space and means for recirculating the second fluid after separation of dirt and bed material to be re-used in said space.

* * * * *